(12) United States Patent
Reefman et al.

(10) Patent No.: US 8,610,404 B2
(45) Date of Patent: Dec. 17, 2013

(54) CHARGE PUMP DC-DC CONVERTER COMPRISING SOLID STATE BATTERIES

(75) Inventors: Derk Reefman, Best (NL); Freddy Roozeboom, Waalre (NL); Petrus H. L. Notten, Waalre (NL); Johan H. Klootwijk, Eindhoven (NL)

(73) Assignee: NXP B.V., Eindhoven (NL)

( * ) Notice: Subject to any disclaimer, the term of this patent is extended or adjusted under 35 U.S.C. 154(b) by 845 days.

(21) Appl. No.: 12/303,737

(22) PCT Filed: Jun. 1, 2007

(86) PCT No.: PCT/IB2007/052072
§ 371 (c)(1),
(2), (4) Date: Dec. 6, 2008

(87) PCT Pub. No.: WO2007/141722
PCT Pub. Date: Dec. 13, 2007

(65) Prior Publication Data
US 2010/0225278 A1     Sep. 9, 2010

(30) Foreign Application Priority Data

Jun. 7, 2006  (EP) .................................... 06300562

(51) Int. Cl.
*H02J 7/00* (2006.01)
(52) U.S. Cl.
USPC .......................................... 320/117; 320/121
(58) Field of Classification Search
USPC ................................. 320/117, 121
See application file for complete search history.

(56) References Cited

U.S. PATENT DOCUMENTS

| | | | | |
|---|---|---|---|---|
| 4,056,764 A | * | 11/1977 | Endo et al. ..................... | 320/101 |
| 6,064,178 A | * | 5/2000 | Miller ........................... | 320/117 |
| 6,175,214 B1 | | 1/2001 | Mendoza et al. | |
| 6,197,450 B1 | * | 3/2001 | Nathan et al. .................. | 429/236 |
| 6,794,926 B2 | * | 9/2004 | Rader et al. .................... | 327/536 |
| 2004/0174142 A1 | | 9/2004 | Olson | |
| 2005/0208344 A1 | | 9/2005 | Tan | |

FOREIGN PATENT DOCUMENTS

| | | | |
|---|---|---|---|
| EP | 1043825 A2 | | 10/2000 |
| EP | 1217717 A | | 6/2002 |
| JP | 2004178828 A | * | 6/2004 |
| WO | 0025378 A | | 5/2000 |
| WO | 2004/076208 A1 | | 2/2004 |
| WO | 2005027245 A2 | | 3/2005 |
| WO | WO 2005027245 A2 | * | 3/2005 |
| WO | 2006/013538 A2 | | 2/2006 |

OTHER PUBLICATIONS

Notten, Petrus, et al; "Boost-Charging Li-Ion Batteries: A Challenging New Charging Concept"; Journal of Power Sources 145; 2005; p. 89-94.

Kleine, G; "TPS60100 Charge Pump for 3.3-V Systems"; Elektor Electronics, Elektor Electronics, Turnbridge Wells, GB; vol. 27, No. 296, Feb. 2001; p. 58-61; XP001163126; ISSN: 0268-4519.

(Continued)

*Primary Examiner* — Drew A Dunn
*Assistant Examiner* — Robert Grant

(57) ABSTRACT

An electronic device is provided which comprises a DC-DC converter. The DC-DC converter comprises at least one solid-state rechargeable battery (B1, B2) for storing energy for the DC-DC conversion and an output capacitor (C2).

10 Claims, 6 Drawing Sheets

(56) References Cited

OTHER PUBLICATIONS

Mansun Chan, et al; "Area-Efficient CMOS Charge Pumps for LCD Drivers"; IEEE Journal of Solid-State Circuits, IEEE Services Center, Piscataway, NJ, US; vol. 38, No. 10; Oct. 2003; p. 1721-1725; XP011101737; ISSN: 0018-9200.

Notten, P.H.L.; "Rechargeable Batteries: Efficient Energy Storage Devices for Wireless Electronics"; Chapter 4.4; Philips Research Laboratories, Eindhoven, Netherlands.

Roozeboom, F., et al; "Passive and Heterogeneous Integration Towards a Si-Based System-In-Package Concept"; 2005; Elsevier B.V.

Bastug, Ahmet; "Advanced Receivers for High Speed Downlink Packet Access in UMTS"; Disertation—BSc, Middle East Technical University, Ankara, Turkey, 1999; MSc, Bogazici University, Istanbul, Turkey, 2002.

\* cited by examiner

CHARGE PUMP DC-DC CONVERTER COMPRISING SOLID STATE BATTERIES

The invention relates to an electronic device with a DC-DC converter.

If several DC voltages are required within an electronic device or an integrated circuit, typically a DC-DC converter is used to boost the DC voltage or to reduce the DC voltage according to the specific requirements of the electronic device.

DC-DC converters may use a capacitor for capacitive conversion mechanism. For an inductive conversion mechanism, typically a coil and a capacitor are temporarily used to store energy from a switching converter. On the other hand, the capacitive conversion technique merely requires capacitors for the DC-DC conversion. In particular, if the DC-DC converter is implemented as an integrated circuit, the size of the respective components, like the coil, the capacitor, etc. is limited such that the amount of energy, which can be stored in these components is very small. Therefore, a high switching frequency of the switching converter is required such that the energy in the elements is refreshed up to $10^7$ times per second. However, such high frequency can lead to significant problems with regard to EMI as well as to supply lines being polluted and causing interference problems.

Figure 1:
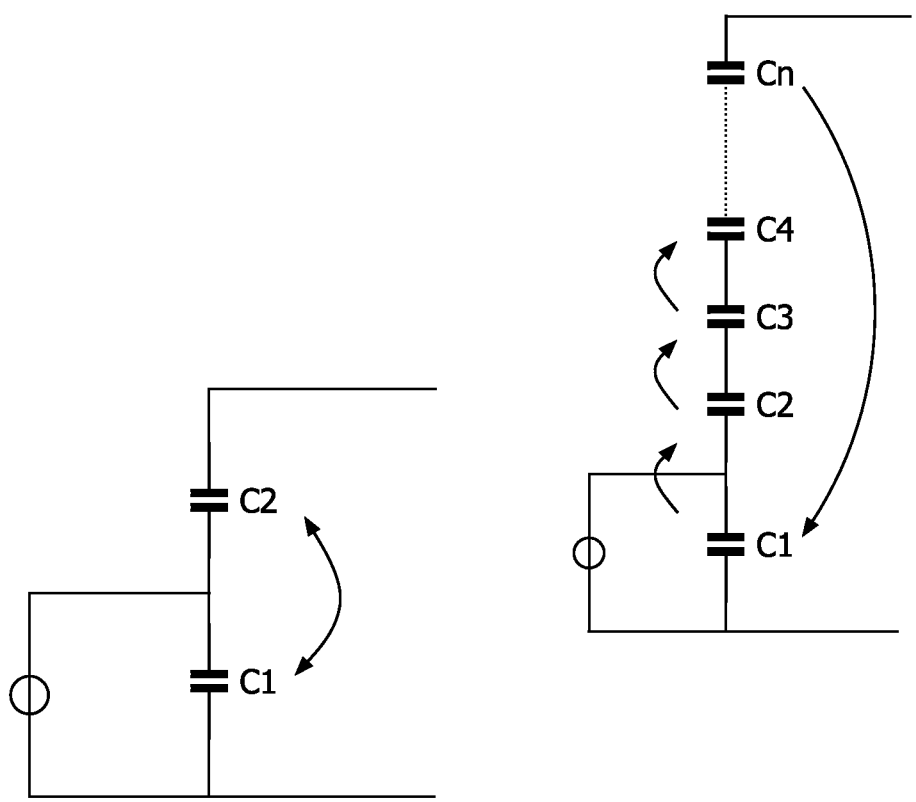

FIG. 1 shows a circuit diagram of a switch capacitor DC-DC converter according to the prior art. Here, in particular a charge pump DC-DC converter is shown. The capacitors C1-Cn can be charged by the voltage source. Due to a number of capacitors which are subsequently charged either in parallel or as single capacitors and which are discharged in series, the output voltage of the DC-DC converter equals an integer number of the supply voltage at the input of the DC-DC converter. In addition, an implementation of the DC-DC converter may also be possible where the output voltage is not an integer multiple but rather a rational number of the input voltage.

The mechanism to perform a DC-DC conversion based on switch capacitors is advantageous with respect to the small size required for the components as compared to an inductive converter. However, if a high efficiency is to be achieved, merely fixed conversion steps are possible, i.e. the converter can only run at e.g. 80% efficiency for the case that the battery voltage is at its nominal value. However, if the voltage drops by 10%, the efficiency may drop to 65%.

It is an object of the invention to provide an electronic device with a DC-DC converter, which is more efficient even if the voltage is lower than the nominal voltage.

This object is solved by an electronic device according to claim 1 and an integrated circuit according to claim 8.

Therefore, an electronic device is provided which comprises a DC-DC converter. The DC-DC converter comprises at least one solid-state rechargeable battery for storing energy for the DC-DC conversion and an output capacitor. As the energy storing capacity of the solid-state batteries is much higher than those of switching capacitors the switching frequency of the DC-DC conversion can be significantly reduced.

According to an aspect of the invention, the at least one solid-state battery is implemented as a thin-film battery in a pore array or trench array, which are etched into a silicon substrate or as a multi-stack planar battery. Therefore, the solid-state battery can be integrated onto the same substrate as the DC-DC converter.

According to a further aspect of the invention, the solid-state battery is implemented as a Li-ion battery such that the battery has a large capacity. According to a further aspect of the invention, the DC-DC converter comprises a first set of switches for charging the at least one solid-state battery according to a first control signal and a second set of switches for discharging at least one battery according to a second control signal.

According to a further aspect of the invention, the switching frequency of the DC-DC converter is less than 1 Hz. With such a low switching frequency, the switching losses can be significantly reduced.

The invention also relates to an integrated circuit with an integrated DC-DC converter, which comprises at least one solid-state rechargeable battery and an output capacitor.

The invention further relates to the idea to replace the capacitors used in the DC-DC converter to store energy by batteries with a small size to store the energy for the DC-DC conversion. This is in particular advantageous as the switching frequency of the converters can be significantly reduced due to the greater capacity of the batteries., i.e. the DC-DC converter is operated at a very low switching frequency. Furthermore, the switching ripple can also be significantly reduced. Moreover, as the switching frequency can be reduced, the switching losses would also be reduced such that the overall power dissipation of the DC-DC converter is reduced. If e.g. trench batteries are used, the size of the DC-DC converter can be reduced to a size, which is comparable to a switch capacitor converter.

Figure 2:
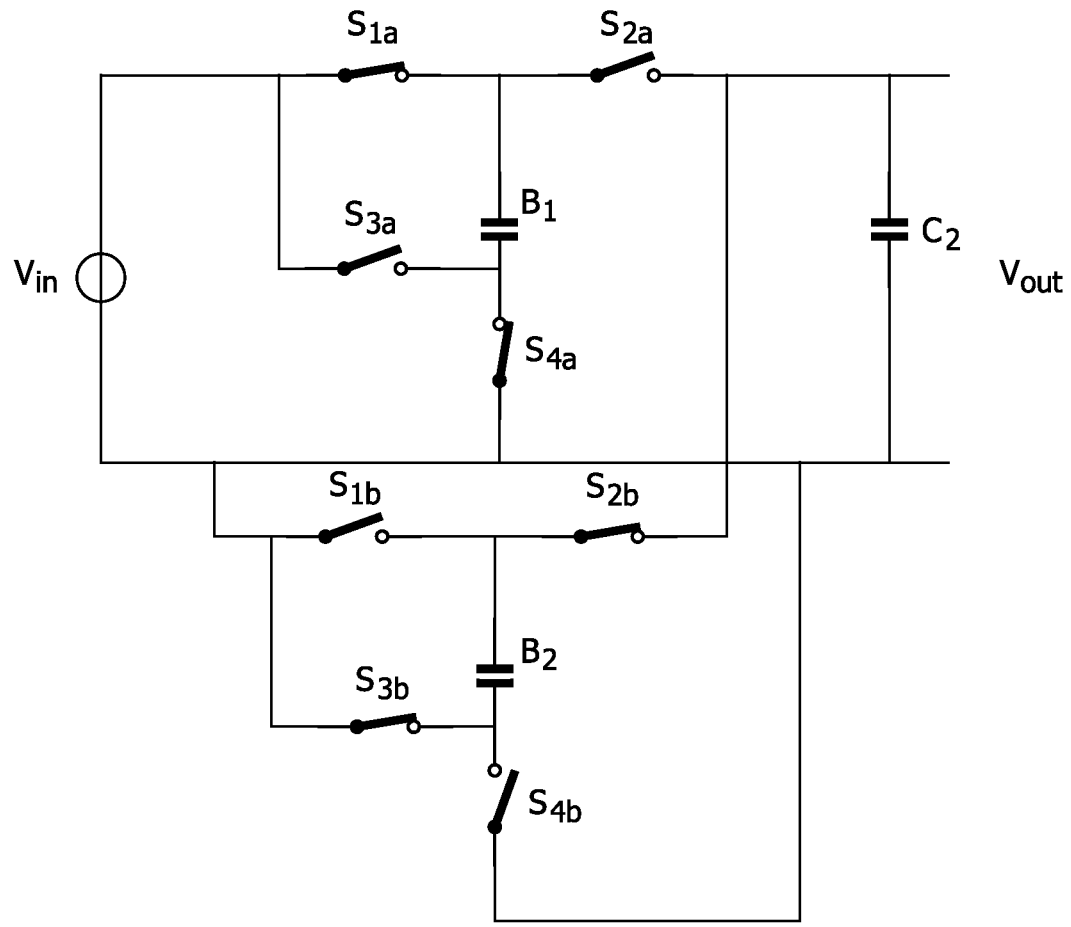
Figure 3:
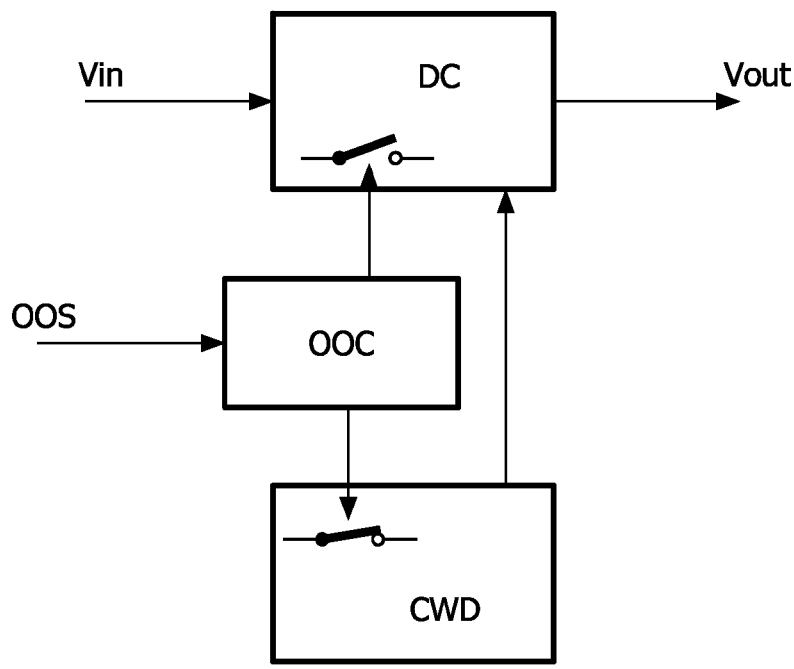
Figure 4:
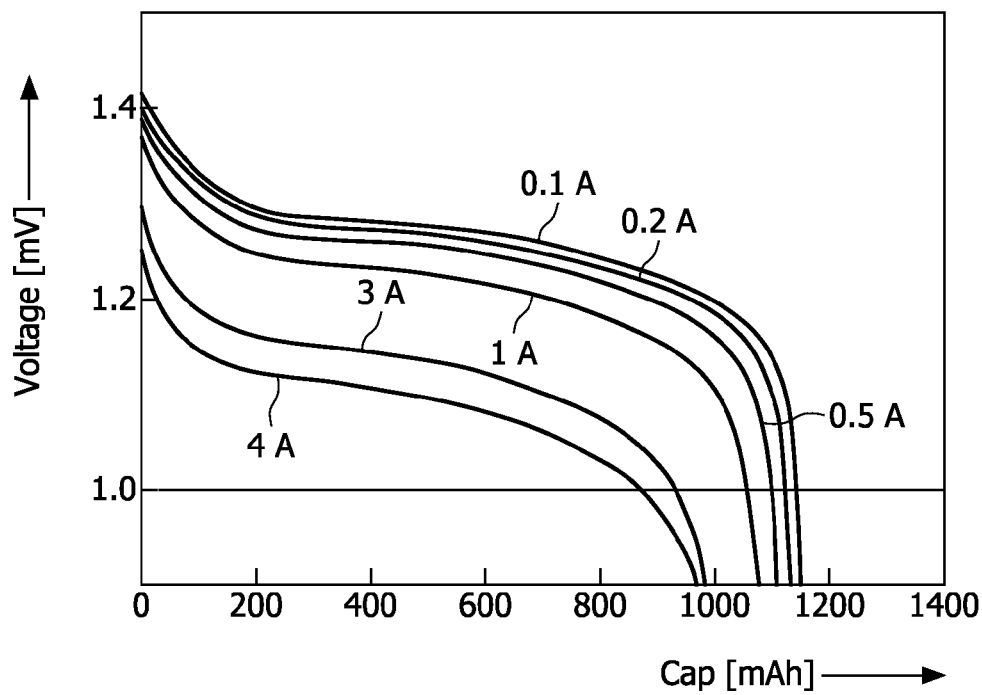
Figure 5:
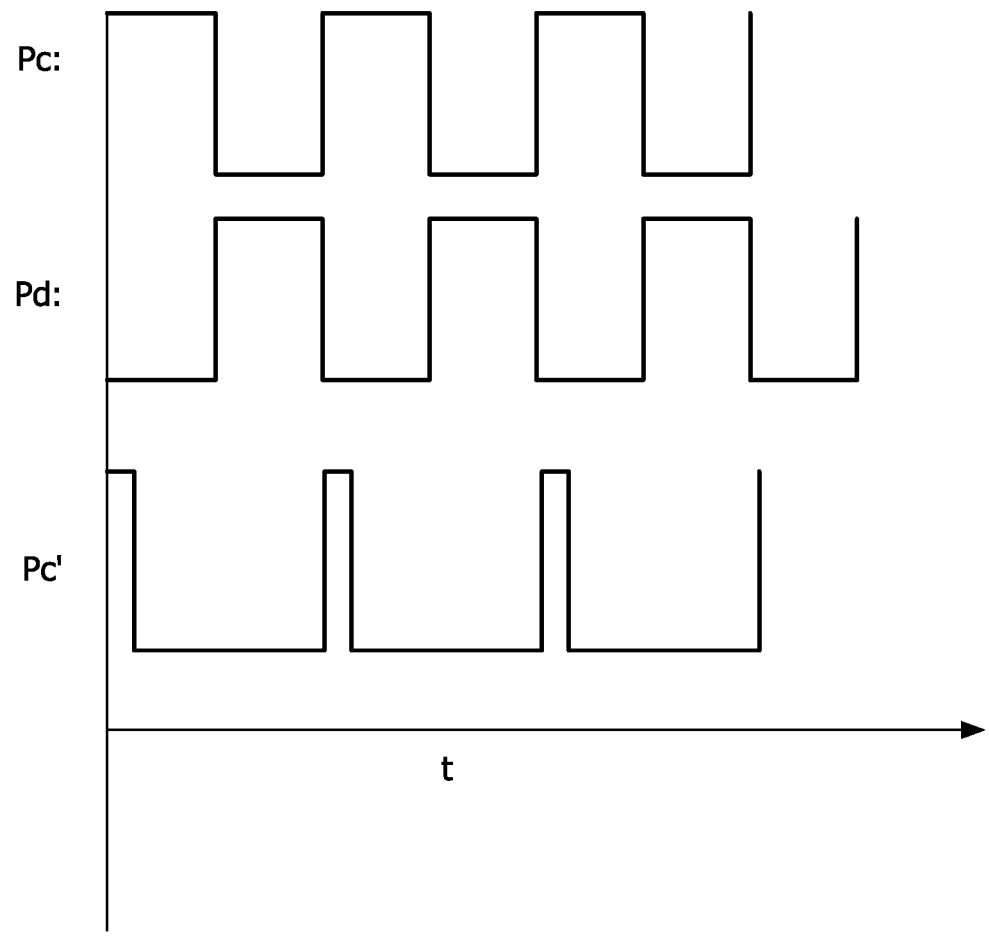
Figure 6:
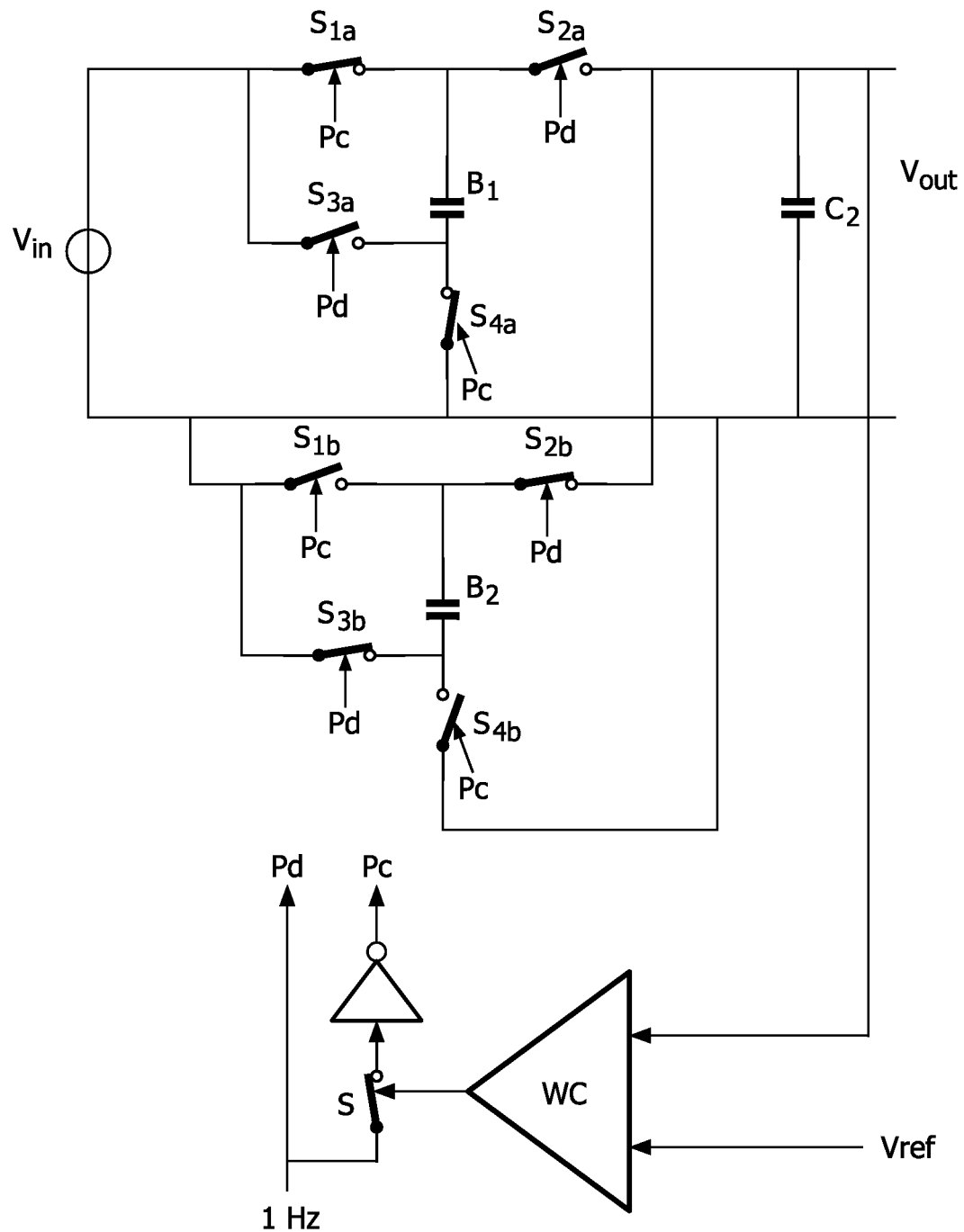
Figure 7:
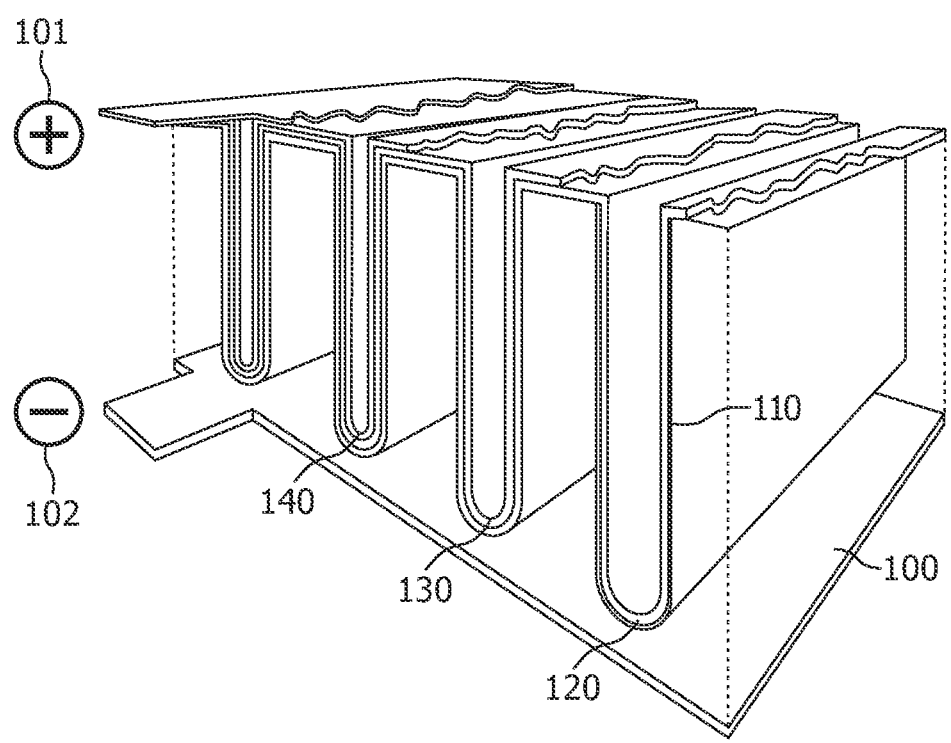

The advantages and embodiments of the present invention are now described in more detail with reference to the drawings in which:

FIG. 1 shows a circuit diagram of a DC-DC converter according to the prior art,

FIG. 2 shows a circuit diagram of a DC-DC converter according to a first embodiment, FIG. 3 shows a block diagram of a DC-DC converter means according to a second embodiment, FIG. 4 shows a graph of a voltage/charge characteristics of a battery according to a third embodiment, FIG. 5 shows a timing diagram of a DC-DC converter according to a first embodiment, FIG. 6 shows a circuit diagram of a DC-DC converter according to a fourth embodiment, and FIG. 7 shows a schematic representation of a trench battery according to a fifth embodiment.

FIG. 2 shows a circuit diagram of a DC-DC converter according to the first embodiment. The DC-DC converter (charge-pump) comprises a first and a second battery B1, B2 and an output capacitor C2 at its output. In addition, the circuit comprises eight switches, S1a, S2a, S3a, S4a and S1b, S2b, S3b and S4b. The switches S1a, S4a, S2b and S3b are driven by a clock signal of phase p and the switches S2a, S3a, S1b and S4b are driven in anti-phase with a clock signal of phase −p. Accordingly, if in a first half of the clock signal the first battery B1 is partly charged, the second battery B2 is partly discharged, and vice-versa in the other half of the clock signal. The output capacitor C2 is used to avoid any voltage-dips during the switch over between the first and second battery B1 and B2. Hence, according to the control of the switched either the first or the second battery is coupled to the output while the other battery can be charged by the input voltage Vin. Here, the first battery B1 is charged by the input voltage Vin as the switched S1a and S4a are closed while the switch S3a is open. As the switch S2a is open, the first battery is de-coupled from the output. The second battery is coupled to the output as the switches S1b and S4b are open while the switches S3b and S2b are closed. As the switch S1b is open the second battery B2 is de-coupled from the input voltage.

Due to the large capacity of the batteries B1, B2 the switching frequency of the DC-DC converter (the number of charge/discharge cycles per second) can be reduced to values as low as 0.1 Hz. Furthermore, the switching ripple can be made exceedingly small (typically, DC:DC converters have an output voltage ripple of about 50 mV) according to the invention ripple values <<1 mV are easily realized.

FIG. 3 shows a block diagram of a DC-DC converter means according to a second embodiment. Apart from a DC-DC converter DC (which can be embodied according to the second or fourth embodiment), an on-off control unit OOC and a charge watch-dog circuit CWD is provided. The charge watch-dog circuit CWD is required as at start-up, i.e. when the batteries are empty, the batteries cannot be charged quickly enough, even if a boost-charging algorithm as described in "Boost-charging Li-ion batteries: A challenging new charging concept—by Notten et al., in Journal of Power Sources 145 (2005) 89-94" is used. To avoid this, the batteries can be kept at a charged level, e.g. by adding a very low-power watch-dog circuit if the DC-DC converter is switched off.

The on-off control signal OOS drives the on/off control unit OOC. If the 'off' signal is received, the DC-DC converter DC is switched off, i.e. all switches S1$a$, ..., S4$b$ are put in this 'off' position and the charge watch-dog circuit CWD is switched on. If the 'on' signal is received, the watch-dog circuit CWD is switched off, and the DC-DC converter DC operates under normal condition.

FIG. 4 shows a graph of a voltage/charge characteristics of a battery according to a third embodiment. Here, the voltage/charge characteristic of a battery are shown with an appropriately chosen chemistry. The battery voltage depends on the amount of charge in the battery. Accordingly, by controlling the amount of charge in the battery, the battery voltage can be adjusted to a desired value. A 30% ariation of the input/output ratio of a DC-DC converter can be sufficient to compensate for small input voltage variations (due to draining the battery) while keeping the output voltage constant. However, the variations of the input/output ratio must be slowly changed if the output voltage is to remain constant. This can be achieved by switching frequencies being higher than 1/(1 hour). The voltage variations as depicted in FIG. 4 may occur within a time scale of 1 hour.

Therefore, by an appropriate battery-chemistry a variable output voltage (i.e., a voltage that is not a fixed multiple of the input voltage) can be achieved.

FIG. 5 shows a timing diagram of a DC-DC converter according to FIG. 2. Here, the two control signals Pc for charging and Pd for discharging are shown. The duty cycle of the control signal can be different during the charging of the capacitor (or the batteries) as compared to the discharging of the capacitor (or the batteries). For charging the capacitor (or the batteries), the switches S1$a$, S4$a$, S1$b$ and S4$b$ are required while for discharging the capacitor (or the batteries) the switches S2$a$, S3$a$, S2$b$ and S3$b$ are required. Accordingly, the control signal Pc for the charging switches will be different to the control signals $P_d$ for the discharging switches. If no output voltage control is present, these control signals could simply be connected through a fixed relationship (e.g. Pd=−Pc). However, if the state-of-charge of the batteries needs to be varied, the control signals need to be adjusted. If the output voltage is to be lowered, the duty cycle of the charging cycle needs to be lowered as well, i.e. the control signal Pc' is adjusted. The control signal Pd for discharging can remain unchanged. Accordingly, the batteries (on average) discharge during a complete charge/discharge cycle. Therefore, a lower output voltage is achieved. As an example, a simple control signal Pc would be to turn the duty cycle of the signal Pc to zero.

FIG. 6 shows a circuit diagram of a DC-DC converter according to a fourth embodiment. Here, the circuit diagram of FIG. 2 with the first and second battery B1, B2 and the output capacitor C2 together with the respective switches are shown. The switches for charging the capacitor (or the batteries) S1$a$, S4$a$, S1$b$, S4$b$, are controlled by the control signal Pc. The switches for discharging the capacitor (or the batteries), i.e. the switches S2$a$, S3$a$, S2$b$, S3$b$, are controlled by the control signal Pd. In addition, a window comparator WC is provided which receives a reference voltage Vref and the output voltage $V_{out}$ as input signals.

A clock signal clk (e.g. of 1 Hz or <1 Hz) generates the signal Pd for the switches for discharge. The signal Pc, driving the switches for charging the capacitor (or the batteries), can be switched on/off, based on the output of the window comparator WC. The window comparator WC determines whether the output voltage being within a certain window equals to the required reference voltage Vref. If the output voltage is too high, the switch S is opened, and the duty cycle of Pc is zero. If the output voltage is too low, the switch is closed and becomes non-zero.

It should be noted that more complex and refined schemes and circuitries may be possible based on the principles of the invention.

Although in the above the principles of the invention have been described with regard to the circuits as shown in FIGS. 2, 4 and 6, it should be noted that batteries, in particular trench batteries, can be used instead of capacitors in other DC-DC converters which are based on capacitors.

FIG. 7 shows a schematic representation of a trench battery according to a fifth embodiment, which can be used in the DC-DC converter according to FIG. 2 or FIG. 6. The battery is implemented with a solid-state Li-ion battery layer stack. This battery layer stack can be implemented as pore array or trench arrays, which are etched into a Si-substrate 100. On top of the Si substrate 100 a barrier layer 110 (e.g. of Ta etc) is provided. On the barrier layer 110 a layer 120 of amorphous Si a-Si is provided. Then a layer 130 of solid electrolyte ($LiNbO_3$ etc) and a layer 140 of $LiCoO_2$ is provided.

As the battery layers are implemented on silicon, they can be integrated in state of the art MOS fabrication processes. Furthermore, the batteries according to FIG. 7 and the DC-DC converter according to the invention can be integrated into a system-in-package SiP.

The structure and the manufacturing of such a solid-state battery is described in WO 2005/027245-A2, which is incorporated herein by reference.

The above described DC-DC circuits can be used in handheld devices, i.e. battery-operated devices like mobile phones, PDAs, etc. If a high stable voltage is required, the DC-DC converter according to the invention can be applied in LCD displays or memory devices, in particular in mobile phones as EMI and spectral pollution is to be avoided.

By replacing the capacitors by small-sized batteries, for example trench batteries, the switching frequency of the converter, i.e. the number of charge/discharge cycles per second, can be reduced to values as low as 0.1 Hz. The switching ripple can be made exceedingly small—typically, DC-DC converters have an output voltage ripple of about 50 mV, with this approach ripple values <<1 mV are easily realized. This has a significant advantage in that the switching ripple on the output voltage does (in most relevant applications) not lead to spectral problems due to mixing of the switching frequency with any signal frequency.

The use of trench batteries for this application is highly advantageous, as they lead to a very small size of the DC-DC converter, comparable to that of a switched capacitor converter operating at much higher switching frequency. As an additional benefit, the switches operate at a very low frequency due to which the switching losses in these devices are much reduced. In a typical situation, the switching losses take about half of the losses in a converter. It can thus be anticipated that, depending on the quality of the battery, the losses of the converter described above are probably half that of a standard converter.

In a further embodiment, multi-stack planer batteries can be used.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. Electronic device, comprising:
   a DC-DC converter having at least one solid-state rechargeable battery for storing energy for the DC-DC conversion and an output capacitor;
   an on-off control unit for controlling the on and off switching of the DC-DC converter; and
   a charge watch-dog circuit for keeping the at least one battery at a charge level if the DC-DC converter is switched off by the on-off control unit,
   wherein a switching frequency of the DC-DC converter is less than or equal to 1 Hz.

2. Electronic device according to claim 1, wherein the at least one solid-state battery is embodied as a thin-film battery, as a thin-film battery in a pore array being etched into a silicon substrate, as a thin-film battery in a trench array being etched into a silicon substrate; or as a multi-stack planar battery.

3. Electronic device according to claim 1, wherein the solid-state battery comprises a Li-ion battery.

4. Electronic device according to claim 3, wherein the DC-DC converter comprises a first set of switches which are used for charging the at least one solid-state battery according to a first control signal and a second set of switches which are used for discharging the at least one battery according to a second control signal.

5. Electronic device according to claim 4, wherein the first and second control signal are controlled independently to adjust an output voltage of the DC-DC converter.

6. Integrated circuit, comprising:
   a DC-DC converter having at least one solid-state rechargeable battery for storing energy for the DC-DC conversion and an output capacitor;
   an on-off control unit for controlling the on and off switching of the DC-DC converter; and
   a charge watch-dog circuit for keeping the at least one battery at a charge level if the DC-DC converter is switched off by the on-off control unit,
   wherein a switching frequency of the DC-DC converter is less than or equal to 1 Hz.

7. The integrated circuit of claim 6, wherein the at least one solid-state battery is embodied as a thin-film battery, as a thin-film battery in a pore array being etched into a silicon substrate, as a thin-film battery in a trench array being etched into a silicon substrate; or as a multi-stack planar battery.

8. The integrated circuit of claim 6, wherein the solid-state battery comprises a Li-ion battery.

9. The integrated circuit of claim 8, wherein the DC-DC converter comprises a first set of switches which are used for charging the at least one solid-state battery according to a first control signal and a second set of switches which are used for discharging the at least one battery according to a second control signal.

10. The integrated circuit of claim 9, wherein the first and second control signal are controlled independently to adjust an output voltage of the DC-DC converter.

* * * * *